Patented Sept. 11, 1928.

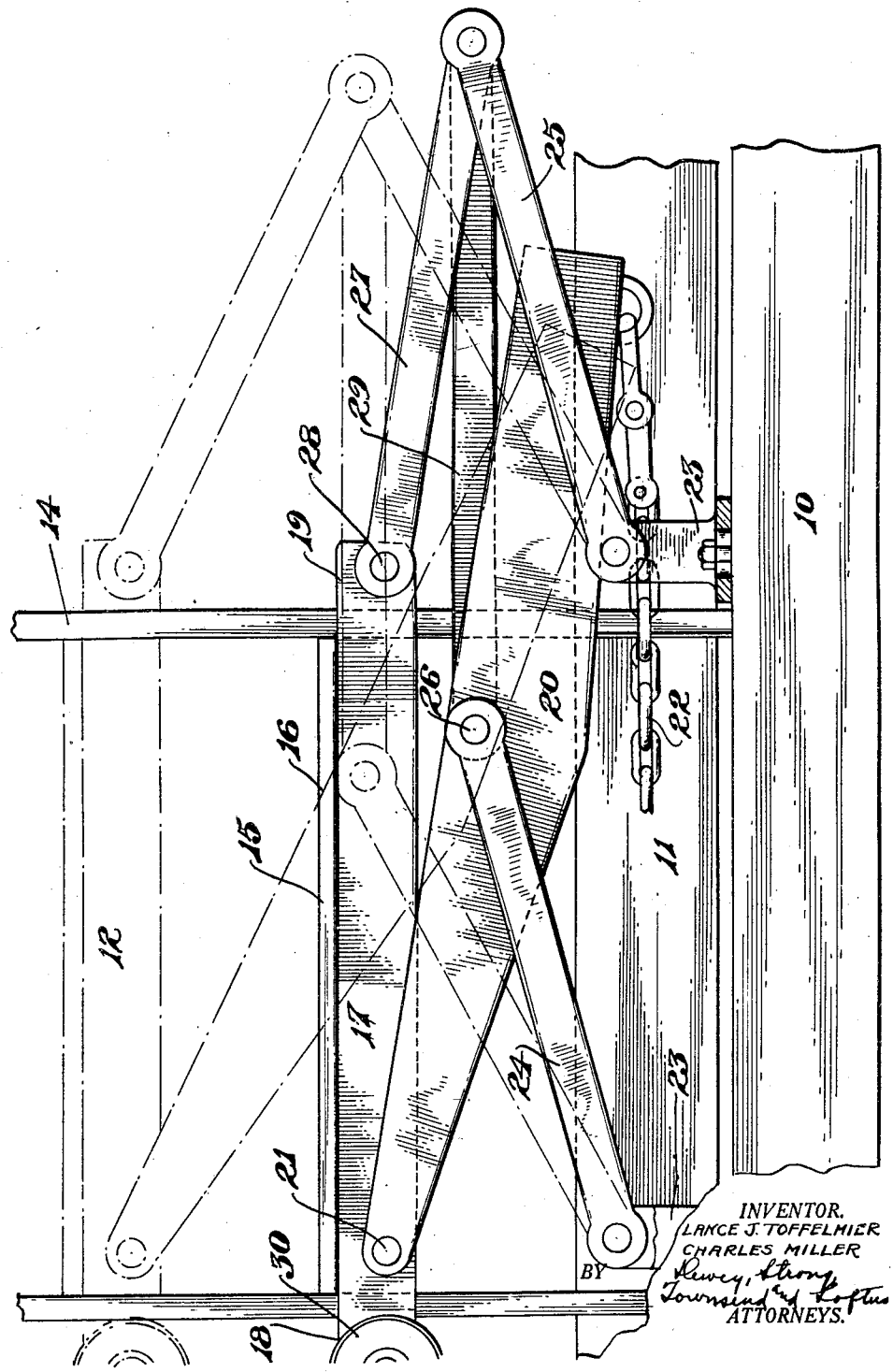

1,683,935

UNITED STATES PATENT OFFICE.

LANCE J. TOFFELMIER, OF SAN LEANDRO, AND CHARLES MILLER, OF OAKLAND, CALIFORNIA, ASSIGNORS TO JUNIOR MONARCH HAY PRESS COMPANY, OF SAN LEANDRO, CALIFORNIA, A CORPORATION OF CALIFORNIA.

FOLLOWER-OPERATING MECHANISM FOR HAY PRESSES.

Application filed May 18, 1926. Serial No. 109,832.

This invention relates to hay presses and particularly pertains to the follower operating mechanism of presses of this character.

Prior to my invention the follower mechanism of hay presses included a pair of toggle arms which extended outwardly and were connected at their upper ends with opposite sides of the follower. The lower ends of these toggle arms were connected by chains to rotatable sheaves driven by the power plant of the press. When the follower was elevated in the chamber, the chains were wound on the sheaves, drawing the lower ends of the arms together which caused forceful elevation of the follower. Due to the leverage required, these toggle arms were quite long and necessitated a considerable amount of clearance for the press to operate in. This made the press extremely long and prevented it from being operated in small enclosures. Due to the fact that these arms must be moved in opposite directions certain complications resulted in the driving mechanism wherein frictional losses were great and severe strains placed on the press.

It is the principal object of the present invention to generally improve and simplify the construction and operation of hay presses by providing a single toggle arm mechanism for operating the follower, thereby permitting the over all length of the presses to be reduced to a minimum, and likewise simplifying the driving mechanism of the press.

In carrying out this object we provide a pair of parallel downwardly inclined arms which are connected to the frame by parallel links which are inclined oppositely to the arms. The upper ends of the arms are connected to opposite ends of the follower. One of the arms is formed with a rigid extension which may be connected by a chain to a rotatable sheave driven by the driving mechanism of the press. So that the arms may operate in unison they are connected by a connecting rod which extends between the pivotal connections between the links and the arms.

One form which the invention may assume is exemplified in the following description and illustrated by way of example in the accompanying drawings, in which:

The figure is a view in longitudinal section through the press disclosing the follower operating mechanism in lowered position in full lines and in a raised position in broken lines.

Referring more particularly to the accompanying drawings, 10 indicates the longitudinal main frame members of a hay press which in the present instance are formed of channel iron and are spaced apart upon opposite sides of the longitudinal center line of the hay press. These frame members carry ground wheels (not shown) which support the press and permit it to be transported from place to place. Above the main frame members 10 are longitudinal frame members 11 likewise of channel iron and arranged upon opposite sides of the longitudinal center line of the press. In the present instance these sub-frame members 11 are spaced further apart than the main frame members 10.

Supported by the frame members 10 and 11 is a vertically disposed chamber 12 within which the hay is fed by the feeder mechanism. As this latter mechanism together with the main operating parts of the press form no part of my present invention, it is not illustrated. It will suffice to say that the chamber 12 is formed with ends and sides, the ends being formed of vertically disposed channel bars 14, that is to say, each end of the chamber is formed of two parallel and vertically disposed channel bars which are arranged upon opposite sides of the longitudinal center line of the machine and spaced slightly apart to form vertical guideways in the ends of the chamber.

Arranged within the chamber for vertical reciprocation therein is a follower 15 which comprises a platform 16 disposed within the chamber and of dimensions substantially agreeing with those of the chamber. Depending downwardly from the center of the platform 16 of the follower 15 is a longitudinal web 17 which is formed as a rigid part of the follower. The ends 18 and 19 of the web 17 project through the guideways in the ends of the chamber and are adapted to cooperate therewith to guide the follower 15 in its vertical reciprocation within the chamber 12.

To vertically reciprocate the follower 15, we provide a main follower arm 20 which is pivotally connected at its upper and forward end to the web 17 of the follower 15 at a point indicated at 21. The lower and rear end of the main follower arm 20 is connected with a drag chain 22 which is led forwardly to the drive mechanism of the hay press. This latter mechanism is old and well known and is therefore not illustrated.

It should be stated, however, that it usually includes a sheave over which the chain 22 is led and to which the chain is fastened so that rotation of the sheave in one direction will draw the chain 22 forwardly and rotation in the other direction will release the chain and permit it to be drawn rearwardly. The sheave may be driven in synchronism with the other mechanisms of the press in any preferred manner.

The frame members 10 are fitted with pairs of bearings 23 which are spaced apart longitudinally of the machine, one bearing of each pair being disposed upon opposite frames 10 in transverse alignment. These bearings 23 are connected with the lower ends of pairs of vertically swinging toggle links 24 and 25. The links comprising the pair 24 are arranged in parallelism and converge toward their upper ends and are pivotally connected to the main follower arm 20 at a point indicated by the numeral 26. This pivotal point of connection between the links 24 and the follower arm 20 occur substantially at the center of the follower arm 20.

The upper ends of the links 25 are connected to the rear end of a pair of arms 27, the forward ends of which are pivotally connected to the rear end of the follower as at 28. The length of the links 24 and 25 are equal and likewise the distance between the centers of the arms 27 equals the distance between the points where the links 24 connect with the follower arm 20 and the point where the follower arm connects with the web 17 of the follower 15.

So that the links 24 and 25 will operate in unison and create a toggle action, a connecting rod 29 is connected at its rear end to the pivotal point between the links 25 and the arms 27 and at its forward end to the pivotal point between the links 24 and the main follower arm 20. This connection provides a point of support for the follower both at its forward and at its rear end so that the follower will be raised in a level position when a pull is exerted on the chain 22.

In operation of the device the follower mechanism cooperates with the feeder of the press so that when the feeder discharges hay into the chamber 12 the follower 15 moves vertically and presses the hay. To move the follower vertically the sheave is rotated and draws the chain 22 forwardly which exerts a pull on the lower end of the main follower arm 20. This pull simultaneously moves the upper end of the arm 20 upwardly and swings the toggle arms 24 and 25 upwardly and forwardly exerting an upward push on both ends of the follower 15.

As the amount of movement of the arms 24 and 25 is equal due to the provision of the connecting rod 29, the forward and rear ends of the follower 15 will be moved upwardly in unison a uniform distance. When the follower has reached the upper end of its travel the chain 22 is released and the weight of the follower causes it to lower to a position shown in full lines in the drawing.

To take up the rear thrust on the follower, its forward end is fitted with bearing wheels 30 which engage vertical tracks carried by the forward end of the chamber 12.

In order to level up the follower 15, the rear bearings 23 which carry the arms 25 are longitudinally adjustable on the frame members 10. By adjusting these bearings 23 forwardly or rearwardly on the frame members 10, the rear end of the follower may be slightly raised or lowered so as to render it perfectly level within the chamber.

By eliminating the necessity of having two arms to operate the follower, we have reduced the length of the press to a minimum and likewise reduced the amount of floor space required within which to operate the press. This will permit the press to be operated in comparatively small enclosures. Also we have simplified the construction of the press due to the fact that but one driving chain is necessary for operating the follower.

While we have shown the preferred form of our invention, it is to be understood that various changes may be made in its construction by those skilled in the art without departing from the spirit of the invention, as defined in the appended claims.

Having thus described our invention, what we claim and desire to secure by Letters Patent is:

1. In a hay press having a vertically disposed chamber, a follower guided therein for vertical reciprocation, a pair of downwardly inclined parallel arms connected at their upper ends to opposite ends of the follower, a pair of parallel inclined links inclined oppositely to said arms and connected at their lower ends to the frame of the press and connected at their upper ends to said arms, a connection between said links whereby they will operate in unison, and an extension on one of said arms which may be oscillated to vertically reciprocate the follower through the medium of said arms and links, and means for adjusting the connection between the lower end of one of said links and the frame of the press to permit leveling of the follower.

2. In a hay press having a vertically disposed chamber, a follower guided for vertical reciprocation therein, a downwardly inclined follower arm connected at its upper end to one end of the follower, a connection at the lower end of said arm for oscillating it, a link inclined oppositely to the arm and connected at its lower end to the frame of the press and at its upper end to said arm at a point intermediate the ends of the arm, a second arm disposed parallel to the follower arm and connected at its upper end to the other end of the follower, a second link disposed parallel to the first named link and connected at its lower end to the frame and at its upper end to the second arm, a connecting rod extending between the connections between the links and the arms whereby the same will operate in unison when a pull is exerted on the lower end of the follower arm to operate the follower, and means for adjusting the connection between said second link and said frame for leveling up the follower.

LANCE J. TOFFELMIER.
CHARLES MILLER.